Patented Apr. 8, 1947

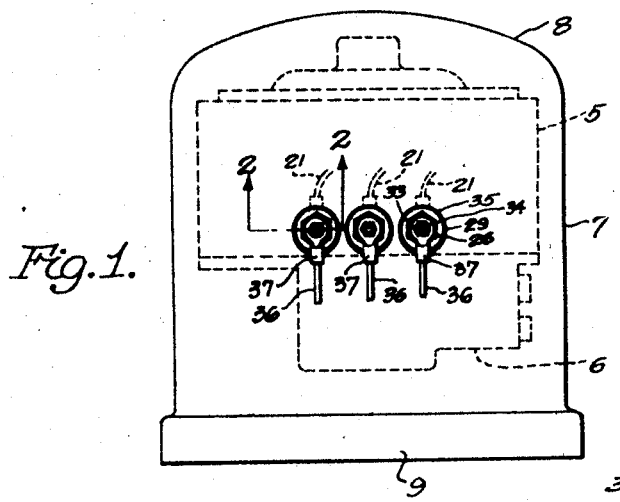
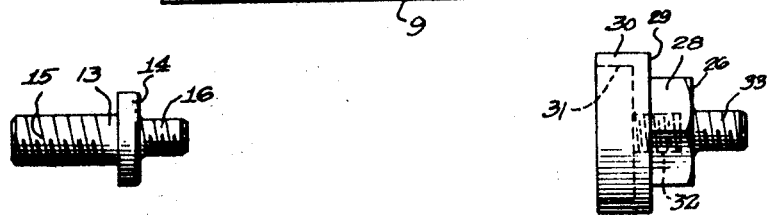
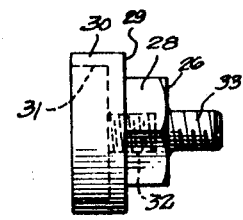
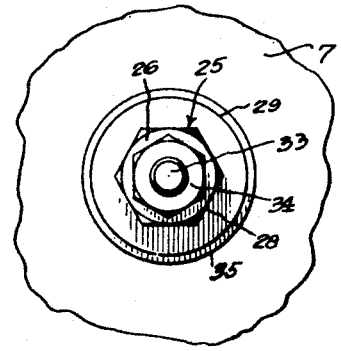
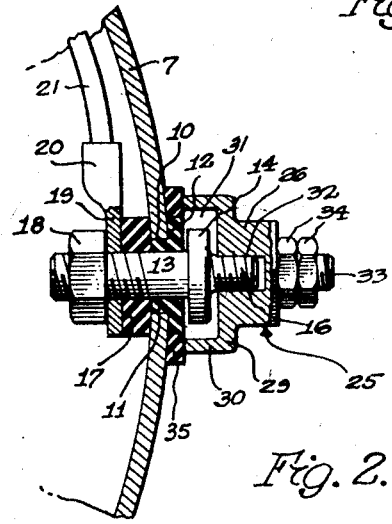

2,418,729

UNITED STATES PATENT OFFICE 2,418,729

AUXILIARY TERMINAL FOR SEALED-IN MOTOR COMPRESSOR UNITS

William J. Schemers, Detroit, Mich.

Application October 1, 1945, Serial No. 619,574

8 Claims. (Cl. 174—153)

The present invention relates to improvements in electrical terminals for the sealed-in units of electrical refrigerating machines and has reference more particularly to an auxiliary or replacement terminal for the motor compressor units of such refrigerating machines.

The primary object of the invention is to provide an auxiliary or replacement terminal for the sealed-in motor compressor units of automatic electrical refrigerating machines which may be installed by a repairman or unskilled mechanic without necessitating the returning of the sealed-in motor compressor unit to the factory for repair when one of the terminals of the motor-compressor unit becomes loosened to such an extent as to permit the escape of the refrigerant gas and the lubricant in which the motor-compressor unit is placed to the atmosphere.

Another object of the invention is to provide a replacement or auxiliary terminal sealing element for attachment to the conventional terminal of a sealed-in motor compressor unit of an automatic refrigerator which may be installed and easily coupled with one of the usual terminals of the motor-compressor unit to seal the space between the unit casing and terminal to stop the leakage of the lubricant or gas therebetween without destroying the casing or otherwise mutilating the same.

Another object of the invention is to provide an auxiliary or replacement terminal for sealed-in motor compressor units of automatic electrical refrigerating machine which will establish an effective electrical connection between the source of electrical energy and the conventional terminal without destroying the electrical connection between the conventional terminal and the motor of said sealed-in motor compressor unit.

Another object of the invention is to provide an auxiliary electrical terminal for the sealed-in motor compressor units of automatic electrical refrigerating machines which is comparatively easy and quick in installation, requires a small amount of time and labor for installation and is efficient under all operating conditions.

Other objects and advantages of the invention will become apparent during the course of the following description of the accompanying drawing, wherein:

Figure 1 is a side elevational view of a sealed-in motor compressor unit showing the manner in which the auxiliary terminal is affixed to the standard terminals thereon;

Figure 2 is a fragmentary enlarged horizontal cross-sectional view taken on line 2—2 of Figure 1 looking in the direction of the arrows and showing one of the conventional electrical terminals with the auxiliary terminal installed and in place;

Figure 3 is an enlarged front elevational view of the auxiliary terminal further showing the various parts thereof;

Figure 4 is a side elevational view of the auxiliary terminal showing the general contour thereof; and Figure 5 is a side elevational view of the conventional terminal stud in present use for electrically connecting the motor of the sealed-in motor compressor unit to a source of electrical energy.

In the drawings, there is shown in Figure 1 a motor compressor unit including a three-phase induction motor 5 and a compressor pump 6 (in dotted lines) which are connected together so that the armature shaft of the motor 5 will drive the compressor pump 6. The motor and compressor are sealed within the housing 7 of cylindrical shape having a top wall 8 and a bottom wall 9 secured in place by welding or the like so as to hermetically seal the motor compressor unit within the housing or casing 7. The housing may be partially filled with lubricant so as to maintain the bearings of the motor compressor lubricated at all times.

Formed in the peripheral wall of the housing 7 is a series of apertures 10 (Figure 2) which are circumferentially spaced equal distances for receiving insulating bushings 11 having flanged portions 12 which engage the outer peripheral surface of the cylindrical housing 7. A threaded stud 13 is passed through the opening in the bushing 11 and is provided with an intermediate annular enlarged portion 14 and threaded end portions 15 and 16 on opposite sides of the annular enlarged flanged portion 14. The threaded stud 13 is passed through the opening in the bushing 11 and is then provided with an insulating washer 17 formed of rubber or other suitable material so that when a nut 18 is threaded on the threaded end 15 of the stud 13, the flanged portion 12 of the bushing 11 will engage and be tightly pressed into sealing contact with the peripheral wall of the housing 7 while the washer 17 will be similarly pressed into sealing contact and engagement with the inner peripheral wall of the housing 7. The annular portion 19 of an electrical connector 20 is interposed between the washer 17 and nut 18 for electrically connecting the lead cables 21 of the three-phase induction motor to the terminal stud 13.

The usual practice consists in installing the terminal studs 13, bushing 11 and washer 17 at the factory when the motor 5 and compressor pump 6 are sealed in the housing. The source of electrical energy and the domestic supply may then be connected to the motor 5 by attaching a cable to the threaded portion 16 of the stud 13 and securing the cable in place by a retaining nut of conventional design. After considerable use, the nut 18 on the threaded end 15 of the stud 13 will become loosened through vibration so as to cause leakage past the sealing washer 17 and bushing 11.

The invention comprises an auxiliary terminal, generally indicated by the reference character 25 and comprising a body portion 26 having a polygonal-shaped portion to provide wrench-engaging faces 28. The body portion 26 is offset as at 29 and provided with a cylindrical portion 30 to thereby form a chamber or socket 31 for receiving the enlarged annular flange 14 on the threaded terminal stud 13.

Also, the body portion 26 is provided with a threaded bore 32 concentric with the annular chamber or socket 31 and annular flange 30 for receiving the threaded portion 16 of the terminal stud 13 as clearly illustrated in Figure 2. On the opposite end of the body portion 26 there is formed a threaded projection 33 which is of the same diameter and thread pitch as the threaded portion 16 on the terminal stud so that the cable retaining nuts 34 may be removed from the threaded portion 16 of the terminal stud 13 and be threaded on the threaded projection 33 of the auxiliary terminal.

Interposed between the annular flange 30 and housing wall 7 of the motor compressor unit is a sealing washer 35 which may be formed of rubber or other suitable insulating material and said washer 35 is provided with a central opening for receiving the annular flanged portion 12 of the bushing 11 so that when the washer 35 is placed in position (Figure 2), one face thereof will engage the outer peripheral surface of the housing 7 while the other face will be engaged by the annular flange 30 formed on the auxiliary terminal.

Operation of the invention

In installing the auxiliary terminal 25, the cable retaining nuts are removed from the threaded portion 16 of the stud 13 and the auxiliary terminal 25 is threaded in place on said threaded portion 16 so as to position the annular flange 30 in engagement with the sealing washer 35. After the threaded portion 16 of the terminal stud has been threaded in the threaded bore 32 of the auxiliary terminal, a wrench may be applied to the polygonal portion 28 of the auxiliary fastener so as to tighten the same in place and cause the annular flange 30 to be forced tightly against the sealing washer 35. As this occurs, a pull is exerted on the threaded terminal stud 13 so as to draw the sealing washer 17 into sealing contact with the inner peripheral surface of the housing 7 and even though the nut 18 has become loosened, the terminal stud 13 will be tightened and re-sealed to prevent the escape of lubricant or gases to the atmosphere. The domestic supply cables 36 may have their connectors 37 affixed to the threaded portion 33 of the auxiliary terminal and electrically connected thereto by threading the retaining nut 34 on the threaded projection 33 of said auxiliary terminal.

It will thus be seen that the auxiliary terminal may be quickly placed in position and installed without necessitating the return of the sealed-in motor compressor unit to the factory so that the insulating bushing and sealing washer may be again tightened in place to provide an effective seal and thereby prevent the escape of lubricant or gases past the insulating and sealing bushing 11 and washer 17.

It is to be understood that the form of the invention herewith shown and described is to be taken as a preferred embodiment thereof and that various changes may be made in the shape, size and arrangement of parts without departing from the spirit of the invention or the scope of the subjoined claims.

What I claim is:

1. An auxiliary terminal for attachment to the threaded male portion of a main binding post terminal with an enlargement externally abutting a housing structure, said auxiliary terminal comprising a body portion having a socket therein for receiving said enlargement and a threaded recess extending inward from said socket for receiving said threaded male portion of said binding post terminal, the rim of said socket forming an annular flange on the body portion surrounding said enlargement and concentric with the threaded recess, and a threaded stud on said body portion for receiving a cable connection.

2. An auxiliary terminal for attachment to the threaded male portion of a main binding post terminal with an enlargement externally abutting a housing structure, said auxiliary terminal comprising a body portion having a socket therein for receiving said enlargement and a threaded recess extending inward from said socket for receiving said threaded male portion of said binding post terminal, the rim of said socket forming an annular flange on the body portion surrounding said enlargement and concentric with the threaded recess, and a threaded stud on said body portion for receiving a cable connection, said annular flange extending over the edges of said enlargement and engaging said housing structure outside said enlargement.

3. An auxiliary terminal for attachment to the threaded male portion of a main binding post terminal with an enlargement externally abutting a housing structure, said auxiliary terminal comprising a body portion having a socket therein for receiving said enlargement and a threaded recess extending inward from said socket for receiving said threaded male portion of said binding post terminal, the rim of said socket forming an annular flange on the body portion, surrounding said enlargement and concentric with the threaded recess, and a threaded stud on said body portion for receiving a cable connection, said body portion being provided with a polygonal shaped portion to facilitate tightening of the auxiliary terminal in place.

4. An auxiliary terminal for attachment to the threaded male portion of a main binding post terminal with an enlargement externally abutting a housing structure, said auxiliary terminal comprising a body portion having a socket therein for receiving said enlargement and a threaded recess extending inward from said socket for receiving said threaded male portion of said binding post terminal, the rim of said socket forming an annular flange on the body portion surrounding said enlargement and concentric with the threaded recess, and a threaded stud on said body portion for receiving a cable connection, said threaded stud being of the same diameter as the terminal portion of said binding post to receive the retaining nuts thereof.

5. In combination with a sealed-in motor compressor unit for refrigerating machines having electrical binding post terminals extending through and insulated from said sealed-in motor compressor unit, an auxiliary terminal comprising a body portion having a threaded recess for receiving the threaded portion of said binding post terminal, an annular flange formed on said body portion providing a cylindrical portion surrounding said threaded recess, a resilient sealing and insulating washer interposed between said annular flange and sealed-in motor compressor unit, and a threaded stud projecting from said body portion for receiving an electrical conductor.

6. In combination with a motor compressor unit encased in a housing in which two or more binding post terminals are mounted and insulated from said housing and in which said binding post terminals are held in place by threaded fastener elements within said housing, an auxiliary terminal comprising a body portion having a threaded recess for receiving a threaded portion of said binding post terminal exteriorly of said housing, a cylindrical portion formed on said body portion for enclosing said binding post, a yielding washer member interposed between the housing and said cylindrical portion, and a threaded projection on said auxiliary terminal for receiving an electrical conductor.

7. In combination with a motor compressor unit encased in a housing in which two or more binding post terminals are mounted with insulation separating said terminals from said housing and in which said binding post terminals are held in place by threaded fastener elements within said housing, an auxiliary terminal comprising a body portion having a threaded recess for receiving a threaded portion of said binding post terminal exteriorly of said housing, a cylindrical portion formed on said body portion for enclosing said binding post, a yielding washer member interposed between the housing and said cylindrical portion, and a threaded projection on said auxiliary terminal for receiving an electrical conductor, said body portion being provided with a polygonal portion for receiving a wrench to facilitate tightening of said auxiliary terminal on said binding post terminal to draw the threaded fastener on the inner end of said binding post into tight contactual engagement with the insulation of said binding post terminal.

8. In combination with a motor compressor unit encased in a housing in which two or more binding post terminals are mounted in openings therethrough with insulation separating said terminals from said housing and in which said binding post terminals are held in place by threaded fastener elements within said housing, an auxiliary terminal comprising a body portion having a threaded recess for receiving a threaded portion of said binding post terminal exteriorly of said housing, a cylindrical portion formed on said body portion for enclosing said binding post, a yielding washer member interposed between the housing and said cylindrical portion, and a threaded projection on said auxiliary terminal for receiving an electrical conductor, said cylindrical portion being adapted to be forced into engagement with the yielding washer element to seal the opening in said housing through which said binding post terminal projects.

WILLIAM J. SCHEMERS.

REFERENCES CITED

The following references are of record in the file of this patent:

UNITED STATES PATENTS

| Number | Name | Date |
| --- | --- | --- |
| 446,871 | Lieb | Feb. 24, 1891 |
| 2,235,429 | Henry et al. | Mar. 18, 1941 |
| 426,204 | Munsie | Apr. 22, 1890 |

FOREIGN PATENTS

| Number | Country | Date |
| --- | --- | --- |
| 17,382 | French | June 5, 1913 |